(12) United States Patent
Koyama et al.

(10) Patent No.: US 6,371,652 B1
(45) Date of Patent: Apr. 16, 2002

(54) BEARING RETAINER

(75) Inventors: Toshisada Koyama; Hiroyuki Yajima; Akimi Furukoshi, all of Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/621,284

(22) Filed: Jul. 20, 2000

(30) Foreign Application Priority Data

Feb. 18, 2000 (JP) .......................................... 12-041820

(51) Int. Cl.$^7$ ................................................ F16C 33/41
(52) U.S. Cl. ........................................ 384/470; 384/531
(58) Field of Search .............................. 384/470, 523, 384/526, 531

(56) References Cited

U.S. PATENT DOCUMENTS 5,015,105 A * 5/1991 Ueno .......................... 384/531
5,035,520 A * 7/1991 Valette ........................ 384/526
5,137,376 A * 8/1992 Gutsche et al. .............. 384/470
5,575,569 A * 11/1996 Shinohara .................... 384/470

FOREIGN PATENT DOCUMENTS

| DE | 28 02 366 A1 | 7/1979 |
| JP | A 9-242760 | 9/1997 |
| JP | A 11-182555 | 7/1999 |
| WO | WO 99/56029 | 11/1999 |

* cited by examiner

*Primary Examiner*—Thomas R. Hannon
(74) *Attorney, Agent, or Firm*—Oliff & Berridge, PLC

(57) ABSTRACT

The freedom of the resilient deformation of the claws 3 is controlled by changing the configuration (diameter and depth) of the cylindrical cut out portion 7 of the bearing retainer 6. And, the necessary force to push and widen the claws 3 is optimized, thereby, it is avoided to damage the ball 11 at the time of setting the ball in the pocket 2.

3 Claims, 3 Drawing Sheets

BEARING RETAINER

BACKGROUND OF THE INVENTION

1. Field of Invention

The present invention relates to a bearing retainer of a ball bearing.

2. Description of Related Art

Conventionally, a bearing retainer 1, one part of which is shown in FIG. 4, is used with a ball bearing. The bearing retainer 1 is an annular body which has a plurality of pockets 2 disposed at a given spacing, and is an integrally molded product. The pocket 2 is a portion to receive balls 11 (see FIG. 3), and by a pair of claws 3 provided per each pocket 2 the balls 11 are prevented from being removed from the pocket, and thereby it can hold the balls rotatably.

Claws 3 have a shape to be able to cover seventy-five percent of the whole periphery of the ball in order to functionally prevent the ball from being removed. For that purpose, at the time of having the ball coupled inside the pocket 2, it is necessary to push the ball to the ends of the claws 3 by adding a force and widening the claws 3.

As mentioned above, the claws 3 are deformed resiliently at the time of ball coupling, since the bearing retainer 1 is a product molded with a resin integrally. However, damage to the ball surface is possible at the time of coupling, since the force to push and widen the claws 3 is given from the surface of the ball directly. Accordingly, it has been necessary to carry out carefully the ball-coupling work in the pocket 2, and also it has been indispensable to carefully confirm if there is any damage after completion of the work.

The present invention has been made in the light of the above problem, and the object thereof is to prevent such situations in which the balls are damaged at the time of assembling the ball in the pocket of the bearing retainer thus increasing the yield rate.

SUMMARY OF THE INVENTION

In order to solve the above problem, according to a first aspect of a bearing retainer of the present invention, a resin made bearing retainer is provided having a plurality of pockets disposed at a given spacing thereon. On each pocket a pair of claws are provided to prevent a ball from being removed. A cut out portion is provided between adjacent claws to control freedom of resilient deformation of the claw.

According to the present invention, by making the resilient deformation of the claws free, due to the cut out portion, the pushing-widening force to be added to the claw at the time of coupling the ball in the pocket of the bearing retainer in the ball bearing assembling process is optimized. For reference, the freedom of the resilient deformation of the claw is controlled by the appropriate change of the shape of the cylindrical cut out portion.

Further, according to a second aspect of a bearing retainer of the present invention, the cut out portion of the first aspect is formed cylindrically. Also, at a central portion thereof a columnar projection is provided, around of which a groove to be in communication with an inner circumference of the retainer and another groove to be in communication with a periphery of the retainer are provided.

In this invention, by changing the shape of the cylindrical cut out portion (diameter, depth etc.), the freedom of the resilient deformation of the claw can be controlled. Further, also by changing the shape (diameter, depth etc.) of the grooves to be in communication with the inner circumference and the periphery of the retainer provided on the inner circumferential surface of the cylindrical cut out portion, the freedom of the resilient deformation of the claw can be controlled.

Further, the cylindrical cut out portion is used as a grease reservoir. And due to the columnar projection provided at the center of the cylindrical cut out portion, the strength of the resistance of the grease when it flows out of the cylindrical cut out portion is controlled. Further, a necessary amount of the grease is supplied through the grooves provided on the circumferential surface of the cylindrical cut out portion to be in communication with the inner circumference and the periphery of the retainer. The necessary amount of the grease to be supplied is controlled by changing appropriately the diameter and depth of the cylindrical cut out portion and the diameter and height of the columnar projection, and the shape of the communicating grooves.

According to a third aspect of a bearing retainer of the present invention, the sectional area of the groove to be in communication between the circumferential wall of the cylindrical cut out portion and the periphery of the retainer is adapted to be greater than the sectional area of the groove in communication between the circumferential wall of the cut out portion and the inner circumferential surface of the retainer.

By this arrangement, the amount of the grease supplied from the cylindrical cut out portion to the circumferential surface of the retainer, that is, the amount of the grease supplied to an inner race of the ball bearing is intentionally controlled, and thereby a large amount of the grease supplied to the inner race side at an initial stage can be prevented.

Further, according to a fourth aspect of the bearing retainer of the present invention, a width of a sectional area of the groove in communication with the periphery of the retainer is widened as it approaches the periphery of the retainer.

DETAILED DESCRIPTION OF PREFERRED EMBODIMENTS

Hereinafter an embodiment of the present invention is explained referring to the attached drawings. For reference, corresponding portions identical to a conventional art are attached with identical signs and explanations thereof are omitted.

Figure 1:
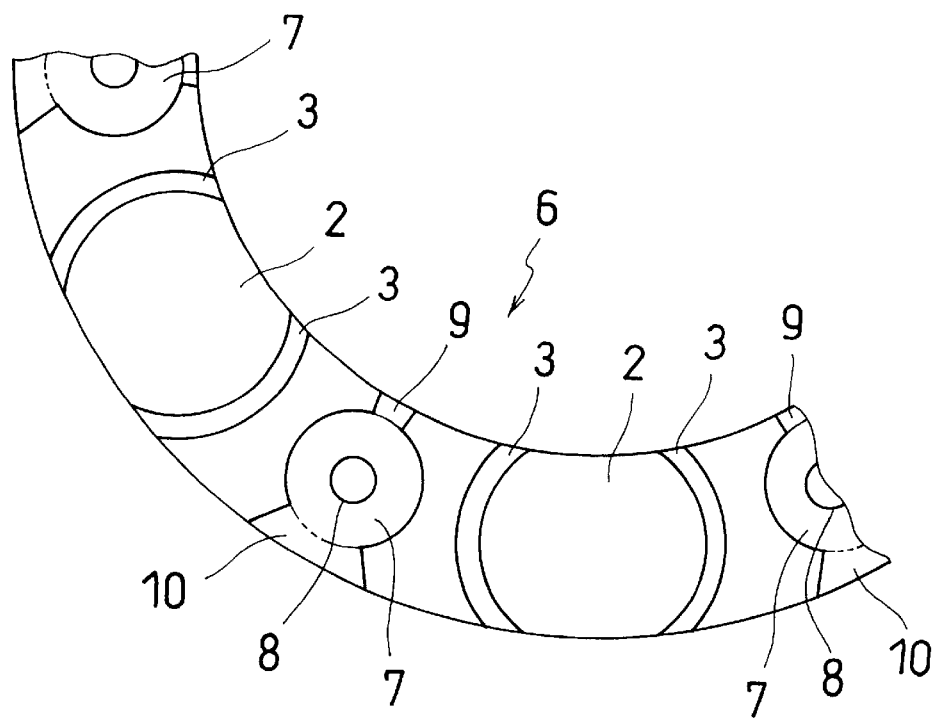
FIG. 1 illustrates a partial view of an upper of the bearing retainer of an embodiment of the present invention.
Figure 2:
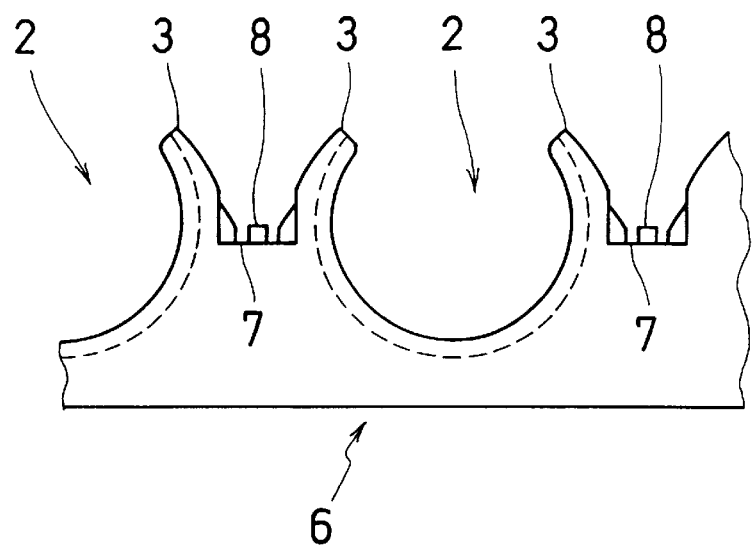
FIG. 2 illustrates a partial view of a side of the bearing retainer of FIG. 1.

FIG. 1 shows a plan view of a bearing retainer 6 of an embodiment of the present invention. Further, FIG. 2 shows a side view of the bearing retainer 6. The bearing retainer 6 is an annular body molded integrally with a resin, and comprises a plurality of pockets 2 spaced each other at a given spacing.

The pocket 2 is for holding a ball 11 (see FIG. 3) and each pocket is provided with a pair of claws for preventing the ball 11 from being removed. The claw 3 is formed of a shape enabling it to cover seventy-five percent of the periphery surface of the ball in order to prevent removal during operation. For reference, since the bearing retainer 6 is in form of a ring in which an identical configuration is continuously repeated, in the drawing thereof only one portion is shown.

A cylindrical cut out portion 7 is provided between the adjacent claws 3, disposed between the pockets 2. Further, at a central portion of the cylindrical cut out portion 7, a column shaped projection 8 is provided. On a circumferential wall of the cylindrical cut out portion 7, a groove 9 in communication with an inner circumferential surface of the retainer and a groove 10 in communication with the periphery surface of the retainer are provided. The sectional area of the groove 10 in communication with periphery surface of the retainer is adapted to be broader comparing with the groove 9 in communication with the inner surface of the retainer. In addition, the groove 10 in communication with the periphery surface of the retainer comprises a configuration to be widened in a fimnel shape as it approaches the periphery surface of the retainer.

The following is an effect to be obtained by the above structure.

Figure 3A:
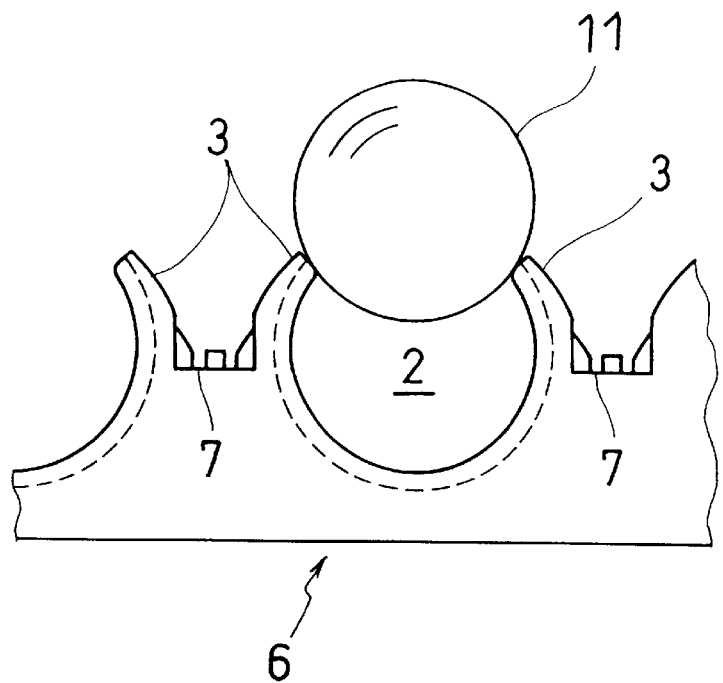
FIG. 3 illustrates a coupling process of a ball into a pocket.
Figure 3B:
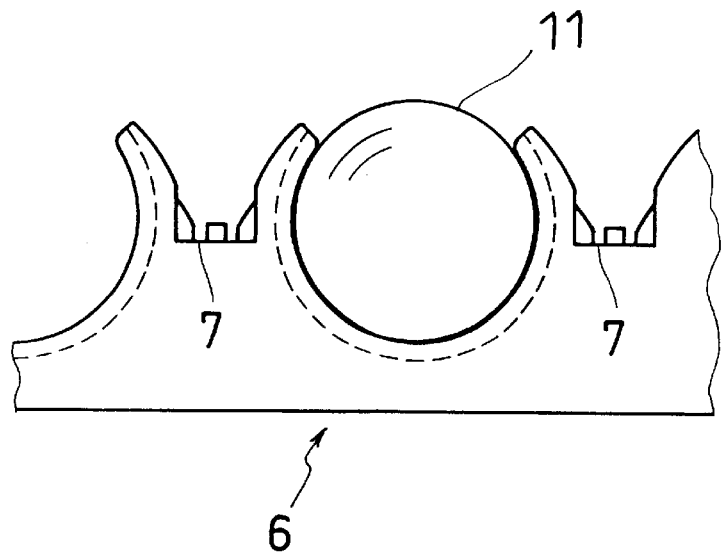
Figure 4:
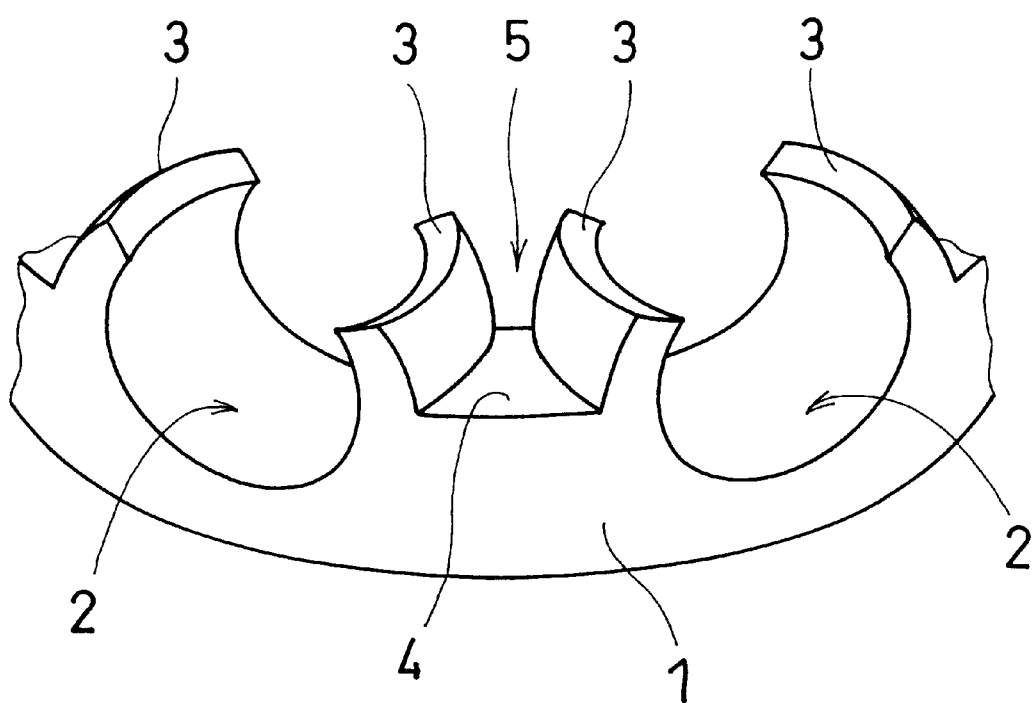
FIG. 4 is a perspective view of one portion of a conventional bearing retainer.

When retaining the ball 11 into a pocket 2, as shown in FIG. 3(a), a ball is pressed against the tips of a pair of claws 3. And, by pushing and widening the pair of claws 3 with the surface of the ball 11, as shown in FIG. 3(b), the ball 11 falls into the pocket 2. At this moment, it becomes possible to control the necessary force to be used for push-widening the claws 3 by controlling the freedom of the resilient deformation force of the the claw.

Therefore, in the present embodiment, by changing a configuration (diameter and depth) of the cut out portion 7, the freedom of the resilient deformation of the claw 3 is controlled. Concretely, by widening the diameter of the cut out portion 7, the thickness of the material which supports the proximal portion of the claw 3 is reduced to enable an increase in the freedom of the resilient deformation of the claw 3. Further, by increasing the depth of the cylindrical cut out portion 7, the thickness of the material to support the proximal portion of the claw 3 is reduced to enable an increase in the freedom of the resilient deformation of the claw. To the contrary, by reducing the diameter of the cylindrical cut out portion 7 or depth, the freedom of the resilient deformation of the claw 3 can be reduced.

Further, by changing the configuration (width, depth etc.) of the groove 9 in communication with the inner circumferential surface of the retainer and the groove 10 in communication with the periphery surface portion provided on the circumferential surface of the cylindrical cut out portion 7, it is possible to control the freedom of the resilient deformation of the claw 3. Concretely, if the widths of each of the grooves 9 and 10 is increased, a reduction of the thickness of the material to support the proximal portion of the claw 3 is generated, and the freedom of the resilient deformation of the claw 3 is increased. To the contrary, by reducing the depth or width of each of the grooves 9 or 10, the freedom of the resilient deformation of the claw 3 can be decreased.

As mentioned above, by optimizing the force necessary to push and widen the pair of claws 3, it becomes possible to avoid damage to the ball 11, as a result, the yield rate of the productivity of the ball bearing can be increased. For reference, the freedom of the resilient deformation of the claws 3, is adapted to be controlled to the extent the ball 11 does not fall out of pocket 2 unintentionally.

In addition, the cylindrical cut out portion 7 functions as a grease reservoir.

The grease sealed in the cut out portion 7 flows to the inner and outer races by a centrifugal operation at the time of rotation of the bearing retainer 6 with the ball 11, which makes the rolling resistance reduced, contributing to the increased the durability of the ball bearing.

For reference, the amount of the grease flowing from the cylindrical cut out portion 7 to the inner and outer races needs to be increased in order to improve an initial lubricating function of the ball bearing. However, if the grease becomes surplus, the influence of the grease around the bearing is increased, which causes an increase in an average torque value and a change of the torque of the bearing at an initial stage.

In this embodiment, in consideration of the viscosity of the grease and the necessary amount of sealed grease, the amount of the grease supplied to the inner race side of the ball bearing can be controlled by regulating the flowing resistance of the grease flow from the cylindrical cut out portion 7 appropriately, while changing the diameter and the depth of the cylindrical cut out portion 7, the diameter and height of the columnar projection 8 and the configuration of the grooves 9 and 10 and so on.

Further, the amount of the grease supplied from the cylindrical cut out portion 7 to the inner circumferential surface of the retainer, that is, the grease amount supplied to the inner race of the ball bearing is controlled intentionally by making the sectional area of the groove 10 in communication with the periphery surface of the retainer greater than that of the groove 9 in communication with the inner circumferential surface of the retainer, whereby the grease is prevented from being flown to the inner race side of the ball bearing in a large amount at the initial period.

Further, a desired amount of the grease can be securely supplied from the cylindrical cut out portion 7 to the outer race of the ball bearing by making the width of the groove 10 in communication with the periphery surface of the retainer widened as it approaches the periphery surface as a funnel shape.

Since the present invention is structured as described above, the following effects are expected.

First, according to the first aspect of the bearing retainer of the present invention, in the assembling process of the ball bearing, at the time of coupling the ball with the pocket of the bearing retainer, any occurrence of damage to the ball can be avoided to increase the yield.

According to the second aspect of the bearing retainer of the present invention, the freedom of the resilient deformation of the claw can be controlled. Further, in accordance with the viscosity of the grease and the necessary amount to be sealed, the supplying amount of the grease can be freely controlled.

According to the third aspect of the bearing retainer of the present invention, the supplying amount of the grease to the inner race side can be controlled. Further according to the fourth aspect of the bearing retainer of the present invention, the working process of sealing the grease is made simple and secure and can be controlled, and the supply of the desirable amount of grease in the inner and outer race sides of the ball bearing can be carried out securely.

What is claimed is:

1. A bearing retainer made of a resin which has a plurality of pockets disposed at a given spacing each of which is provided with a pair of claws to prevent a ball from removing, wherein a cut out portion to control the resilient deformation of the claw is formed cylindrically between the adjacent pairs of claws, at a central portion of which a columnar projection is provided and on a circumferential wall of which a groove in communication with an inner circumferential surface of the retainer and a groove in communication with a periphery surface of the retainer are provided.

2. A bearing retainer according to claim 1, wherein a sectional area of the groove formed between the circumferential surface of the cylindrical cut out portion and the periphery surface of the retainer is greater than the sectional area of the groove formed between the circumferential surface of the cylindrical cut out portion and the circumferential surface of the retainer.

3. A bearing retainer according to claim 2, wherein the width of the groove formed between the circumferential surface of the cylindrical cut out portions and periphery surface of the retainer is made to be widened as the groove approaches the periphery surface of the retainer.

* * * * *